(12) United States Patent
May

(10) Patent No.: US 11,884,851 B2
(45) Date of Patent: Jan. 30, 2024

(54) SILICATE SHALE INHIBITOR ADDITIVES

(71) Applicant: Halliburton Energy Services, Inc., Houston, TX (US)

(72) Inventor: Preston May, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/550,488

(22) Filed: Dec. 14, 2021

(65) Prior Publication Data

US 2023/0183543 A1 Jun. 15, 2023

(51) Int. Cl.
*C09K 8/06* (2006.01)
*C09K 8/03* (2006.01)
*C09K 8/035* (2006.01)

(52) U.S. Cl.
CPC .............. *C09K 8/06* (2013.01); *C09K 8/032* (2013.01); *C09K 8/035* (2013.01); *C09K 2208/12* (2013.01)

(58) Field of Classification Search
CPC .......... C09K 8/06; C09K 8/032; C09K 8/035; C09K 2208/12
See application file for complete search history.

(56) References Cited

U.S. PATENT DOCUMENTS

| | | | |
|---|---|---|---|
| 3,819,392 A | 6/1974 | Weldes et al. | |
| 10,793,765 B2 | 10/2020 | Fu et al. | |
| 2006/0116296 A1* | 6/2006 | Kippie | C09K 8/12 507/244 |
| 2007/0015668 A1 | 1/2007 | Harrower et al. | |
| 2008/0070811 A1* | 3/2008 | Dino | C09K 8/145 507/240 |
| 2010/0258313 A1* | 10/2010 | Ballard | C09K 8/64 507/135 |

FOREIGN PATENT DOCUMENTS

| | | |
|---|---|---|
| WO | 2006013595 A1 | 2/2006 |
| WO | 2010031993 A1 | 3/2010 |
| WO | 2014191389 A1 | 12/2014 |

OTHER PUBLICATIONS

Foreign Communication from Related Application—International Search Report and Written Opinion of the International Searching Authority, International Application No. PCT/US2022/045534, dated Feb. 1, 2023, 10 pages.

* cited by examiner

*Primary Examiner* — Aiqun Li
(74) *Attorney, Agent, or Firm* — Conley Rose, P.C.; Rodney B. Carroll

(57) ABSTRACT

Methods and compositions including silicate shale inhibitor additives. In some embodiments, the methods include introducing a shale inhibitor additive comprising a silicate anion and a quaternary ammonium cation into a treatment fluid; introducing the treatment fluid into a wellbore penetrating at least a portion of a subterranean formation that comprises shale; and allowing the shale inhibitor additive to interact with the shale in the subterranean formation to at least partially inhibit the shale.

20 Claims, 4 Drawing Sheets

SILICATE SHALE INHIBITOR ADDITIVES

BACKGROUND

The present disclosure relates to compositions and methods for drilling and/or treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a wellbore in a subterranean formation or to complete a wellbore in a subterranean formation, as well as numerous other purposes. A drilling fluid, or "mud," which a drilling fluid is also often called, is a treatment fluid that is circulated in a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

During drilling, fracturing, or other treatment of subterranean formations, various strata that include reactive shales may be encountered. As used herein, the term "shale" is defined to mean materials that may "swell," or increase in volume, when exposed to water. Examples of these shales may include certain types of clays (for example, bentonite). Reactive shales may be problematic during treatment operations because of their tendency to degrade when exposed to aqueous media such as aqueous-based treatment fluids. This degradation, of which swelling is one example, can result in undesirable conditions and undesirable interference with the treatment fluids. Additionally, pore pressure penetration from a treatment fluid into the shale matrix may reduce the support near the wellbore region causing wellbore instability.

Certain existing shale inhibitors that exhibit shale swelling reduction and/or pore-pressure transmission reduction properties require temperature activation to be effective and are therefore sensitive to and dependent on specific downhole conditions.

BRIEF DESCRIPTION OF THE DRAWINGS

These drawings illustrate certain aspects of some of the embodiments of the present disclosure and should not be used to limit or define the claims.

Figure 1:
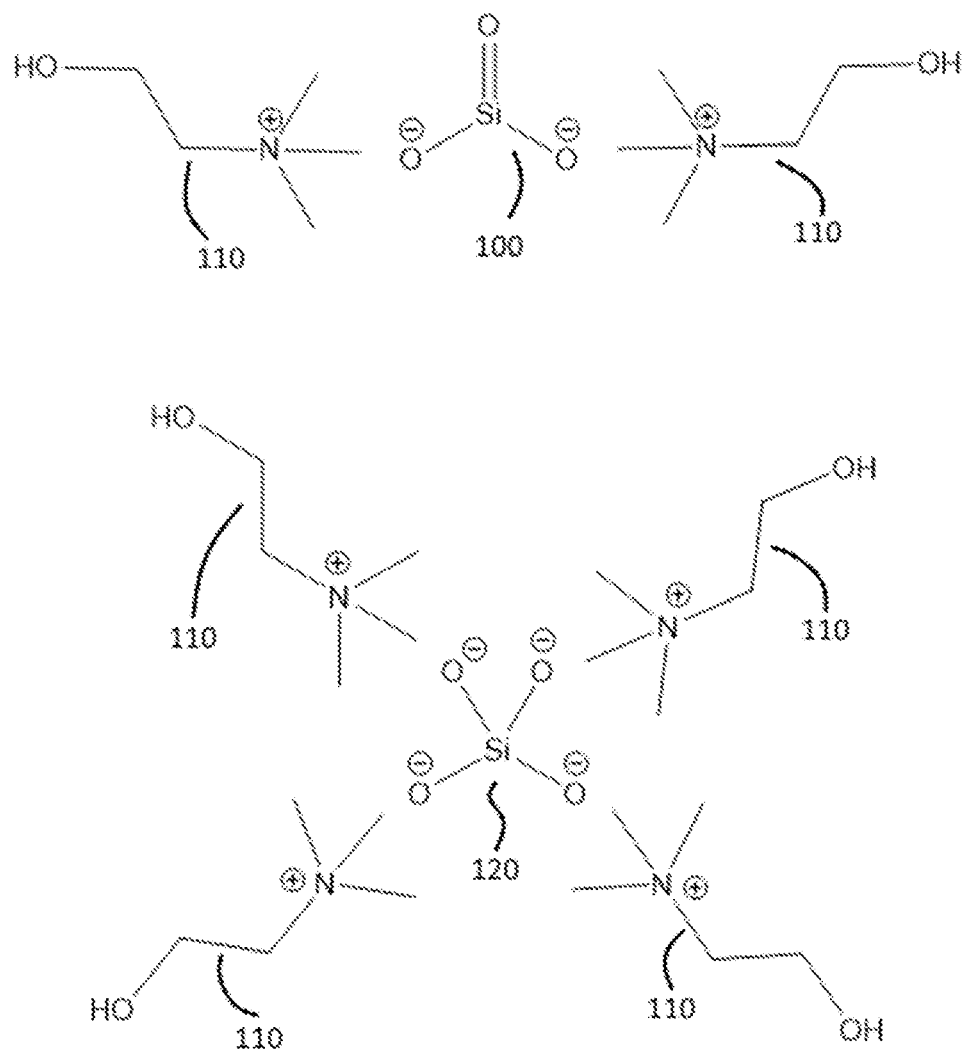
FIG. 1 is a diagram illustrating the chemical structure of choline silicates that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for use in subterranean formations. More specifically, the present disclosure includes providing a treatment fluid including a shale inhibitor additive and introducing the treatment fluid into a wellbore penetrating at least a portion of a subterranean formation.

In certain embodiments, the method of the present disclosure may include providing a treatment fluid including a shale inhibitor additive including a silicate anion and a quaternary ammonium cation; introducing the treatment fluid into a wellbore penetrating at least a portion of a subterranean formation that includes shale; and allowing the shale inhibitor additive to interact with the shale in the subterranean formation to at least partially inhibit the shale.

In some embodiments, the methods may include drilling at least a portion of a wellbore to penetrate at least a portion of a subterranean formation that includes shale; circulating a drilling fluid in at least the portion of the wellbore while drilling at least the portion of the wellbore, the drilling fluid including an additive including a base fluid, a silicate anion, and a quaternary ammonium cation; and allowing the additive to interact with the shale in the subterranean formation to at least partially inhibit the shale. In other embodiments, the compositions of the present disclosure may include an aqueous base fluid; a viscosifying agent; and choline silicate.

Among the many potential advantages to the methods and compositions of the present disclosure, only some of which are alluded to herein, the methods and compositions of the present disclosure may provide a shale inhibitor additive that acts both as a swelling inhibitor and as a pore-pressure transmission reducer. In certain embodiments, the shale inhibitor additives of the present disclosure may operate at a variety of temperatures and may not require temperature activation in order to inhibit shale. In some embodiments, the shale inhibitor additive of the present disclosure may provide more effective shale inhibition than other shale inhibitors, including silicate shale inhibitors. In addition, shale inhibitor additives of the present disclosure including choline may be more environmentally friendly than other shale inhibitors due to the low toxicity of choline. In certain embodiments, one or more components of the shale inhibitor additive may be trackable, allowing for concentration tracking of the shale inhibitor in the treatment fluid.

For example, in certain embodiments, shale inhibitor additives of the present disclosure including a silicate anion and a cation of the present disclosure may provide greater shale inhibition than the individual silicate shale inhibitors at the same concentration.

As used herein, "shale inhibitor" refers to additives and compounds that may demonstrate a propensity for reducing the tendency of shale or clay to absorb water and/or reduce pore pressure transmission from the treatment fluid to the shale matrix.

In certain embodiments, a shale inhibitor additive of the present disclosure may include a cation and a silicate anion. As used herein, "cation" refers to a moiety or polymer that has one or more positive charges. As used herein, "silicate anion" refers to a moiety or polymer that has one or more negative charges and consists essentially of (or consists only of) silica and oxygen atoms. In some embodiments, the shale inhibitor additives of the present disclosure may include the same number of cations as the number of negative charges of the silicate anion. In some embodiments, the shale inhibitor additives of the present disclosure may include a silicate anion and choline. In some embodiments, the shale inhibitor additive may include a choline silicate. For example, in certain embodiments, the shale inhibitor additive may include at least one of the choline silicates shown in FIG. 1. For example, the shale inhibitor additive may include silicate anion $SiO_3^{2-}$ 100 and two choline cations 110, or may include silicate anion $SiO_4^{4-}$ 120 and four choline cations 110. In certain embodiments, the choline silicate may include one or more cationic choline moieties and a silica anion.

In some embodiments, the silicate anion may include an anionic silica moiety including silicon and oxygen atoms. In some embodiments, the silicate anion of the present disclosure may include a single anionic silicate moiety, two or more silicate moieties, or a distribution of silica moieties. In some embodiments, the shale inhibitor additive of the present disclosure may include two or more silicates, or a distribution of silicate moieties.

Figure 2:
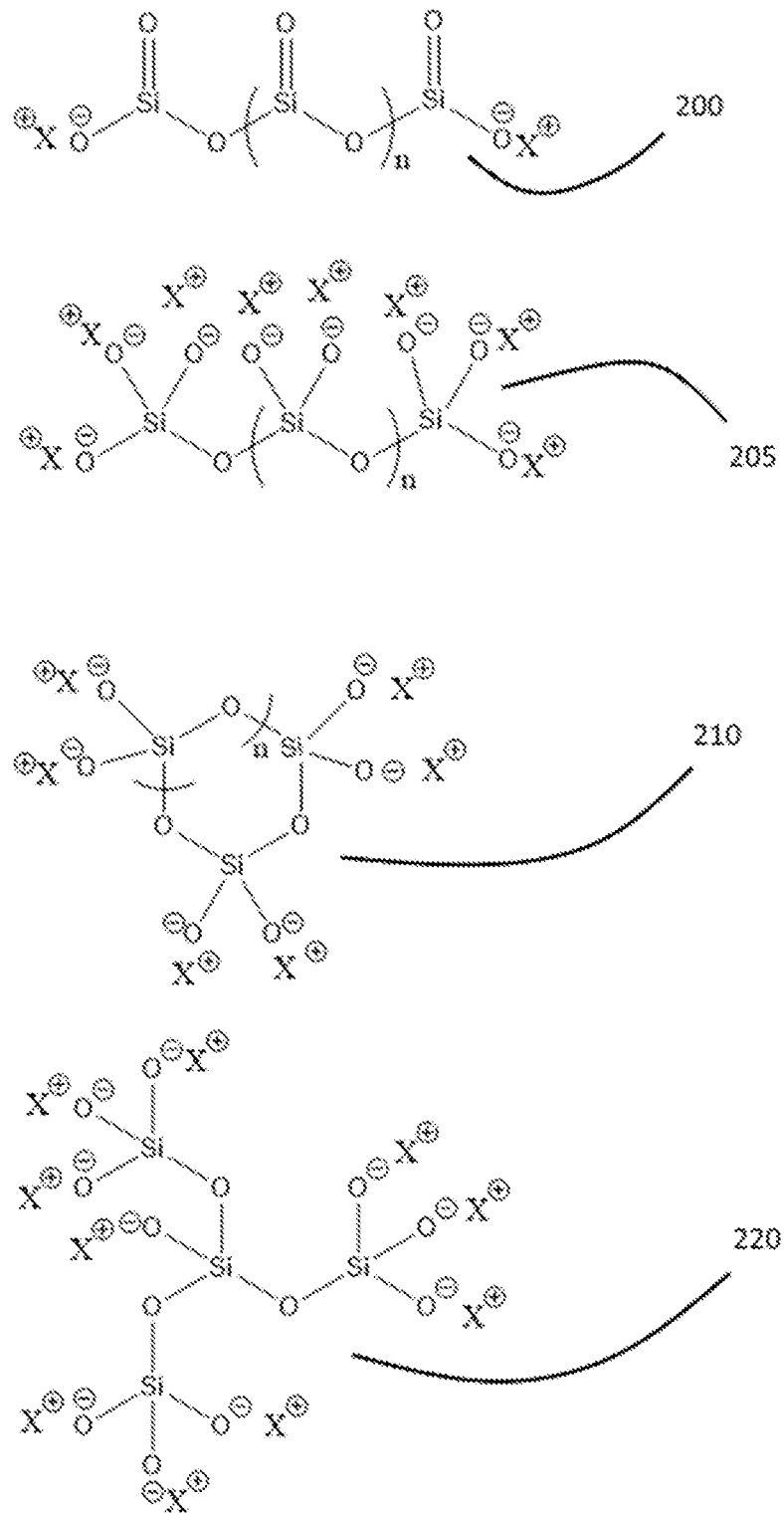
FIG. 2 is a diagram illustrating the chemical structure of shale inhibitor additives that may be used in accordance with certain embodiments of the present disclosure.

Silicate anions suitable for certain embodiments of the present disclosure include, but are not limited to orthosilicates, pyrosilicates, cyclic-silicates, single chain silicates, double chain silicates, sheet silicates, colloidal silicates, any derivative thereof, and any combination thereof. In some embodiments, the silicate anion may include a moiety with a linear silicon chain of from about 1 to about 25 silicon atoms. In some embodiments, a silicate anion may be a cyclic silicate moiety. For example, in certain embodiments, the silicate anions may be linear silicates (e.g., as shown in 200 and 205), a cyclic silicate (e.g., as shown in 210), and/or a branched silicate (e.g., as shown in 220) as shown in FIG. 2. In some embodiments, n in silicates 200, 205, 210 may be an integer from 0 to 20, 0 to 10, 0 to 5, 5 to 20, or 5 to 10. In certain embodiments, n may be greater than 0, 5, 10, 15, or 20. In FIG. 2, $X^+$ may be any suitable cation of the present disclosure.

In some embodiments, the silicate anion may be provided by a natural mineral. Suitable examples of naturally occurring minerals including a silicate include, but are not limited to, phenacite, willemite, zircon, olivine, garnet, thortveitite, benitoite, beryl, pyroxenes, enstatite, spodumene, pollucite, tremolite, crocidolite, talc, petalite, cristobalite, and any combination thereof. One skilled in the art will recognize that in order to be able to use naturally occurring silicates they may need to be finely ground in order to be sufficiently soluble/suspendable. As used herein, the term "finely ground" refers to mesh sizes smaller than or equal to 270 U.S. Mesh (53 microns), 325 U.S. Mesh (44 microns), 400 U.S. Mesh (37 microns), 550 U.S. Mesh (25 microns), 800 U.S. Mesh (15 microns), or 1250 U.S. Mesh (10 microns).

In certain embodiments, the cation of the shale inhibitor additives of the present disclosure may be a quaternary ammonium cation. In certain embodiments, the quaternary ammonium compound may be substantially of the formula $R^1R^2R^3R^4N^+$, where each of $R^1$, $R^2$, $R^3$ and $R^4$ may independently be alkyl chains, hydroxylalkyl chain, ethoxylates, or combinations thereof.

For example, in some embodiments, the cation of the shale inhibitor additives of the present disclosure may include choline. In certain embodiments, the shale inhibitor additives may include choline, acetyl choline, a choline derivative, a tetramethylammonium cation, a tetraethylammonium cation, a tetrapropylammonium cation, a tetrabutylammonium cation, a quaternary amine ethoxylate, and any combination thereof. In certain embodiments, the choline or choline derivative may form the cation of a silicate. In some embodiments, the cation may include a quaternary amine (e.g., tetramethyl ammonium). In some embodiments, the shale inhibitor additive of the present disclosure may include choline silicate. Without wishing to be limited by theory, it is believed that in certain embodiments, the choline may act as a shale swelling inhibitor and the silicate may act as a pore pressure transmission reducer.

In certain embodiments, the shale inhibitor additive may consist of (or consist essentially of) a quaternary ammonium cation and a silicate. In certain embodiments, the shale inhibitor additive may consist essentially of (or consist essentially of) a quaternary ammonium cation, a silicate, and a base fluid. In some embodiments, the shale inhibitor additive may not include a significant amount of any additional cations other than the cation of the shale inhibitor additive. In certain embodiments, the shale inhibitor additive may not include a significant amount of any anions other than the silicate anion.

In certain embodiments, the components of the shale inhibitor additive may be present in a specific range of concentration ratios. In some embodiments, the ratio of silica counter anion to cation in the silicates of the present disclosure may affect the solubility and reactivity of the shale inhibitor additive. For example, in certain embodiments, a higher ratio of silica to cation (or other components of the additive) may provide more reactivity and better shale inhibition and pore pressure transmission reduction compared to the same additive with a lower silica content. In some embodiments, a lower silica content may make the additive more soluble and stable in a base fluid. In certain embodiments, the weight ratio of the silica moiety to the cation in the shale inhibitor additive of the present disclosure may be from about 5:1 to about 1:1 to about 1:20, from about 1:10 to about 1:10, from about 1:3 to about 1:10, or from about 1:1 to about 1:5. A person of skill in the art with the benefit of this disclosure would understand what ratio would be appropriate for a particular application, which may include ratios outside these ranges.

In some embodiments, the cation may be present in the shale inhibitor additive in an amount of from about 1% to about 10%, from about 1% to about 7.5%, from about 2% to about 5%, or from about 3% to about 5%, all by weight of the additive. In certain embodiments, the shale inhibitor additive may include the cation in an amount of about 25% or less, 20% or less, 15% or less, 10% or less, or 5% or less, all by weight of the shale inhibitor additive. In some embodiments, the shale inhibitor additive may include the cation in an amount of about 1% or more, 2% or more, 3% or more, 4% or more, or 5% or more, all by weight of the shale inhibitor additive.

In certain embodiments, one or more components of the shale inhibitor additive may be trackable. For example, in certain embodiments, a sample of a treatment fluid used in a wellbore operation may be analyzed to determine the concentration of one or more components of the shale inhibitor additive.

In some embodiments, the shale inhibitor additive may include an additional salt. Examples of additional salts suitable for certain embodiments of the present disclosure include, but are not limited to NaCl, KCl, ammonium chloride, ammonium nitrate, sodium acetate, potassium acetate, sodium formate, potassium formate, and any combination thereof.

In certain embodiments, the shale inhibitor additives of the present disclosure may be present in or introduced into treatment fluids in an amount sufficient to provide a desired level of shale inhibition. In some embodiments, the shale inhibitor additive of the present disclosure may be added to the treatment fluid in an amount of from about 0.01 to about 10 gallons per thousand gallons (gpt), from about 0.05 to about 5 gpt, from about 0.1 to about 3 gpt, or from about 0.1 to about 1 gpt, all by volume of the treatment fluid.

In certain embodiments, the shale inhibitor additives of the present disclosure may provide effective shale inhibition at temperatures above 150° F. (65.5° C.), above 175° F. (79.4° C.), above 200° F. (93.3° C.), or above 250° F. (121.1° C.).

Certain components of the shale inhibitor additive and treatment fluid may be provided as a "dry mix" to be combined with a base fluid and/or other components prior to or during introducing the treatment fluid into the subterranean formation. In some embodiments, dry mix compositions may be designed to include a base fluid in an amount from about 1 to about 20 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the treatment fluids of the present invention may be prepared in accordance with any suitable technique. In some embodiments, the desired quantity of water may be introduced into a mixer followed by the dry blend. It will be appreciated by those of ordinary skill in the art, with the benefit of this disclosure, other suitable techniques for preparing treatment fluids may be used in accordance with embodiments of the present invention.

Certain components of the shale inhibitor additive may be provided or prepared in a liquid form (e.g., a salt solution) and combined with the base fluid and/or other components of the treatment fluid prior to or during the introduction of the of the treatment fluid into the subterranean formation.

In some embodiments, the shale inhibitor additive may be present in the treatment fluids in an amount of from about 0.1 pound per barrel (ppb) to about 100 ppb (e.g., to about 1 ppb, about 5 ppb, about 10 ppb, about 15 ppb, about 20 ppb, about 25 ppb, about 30 ppb, about 35 ppb, about 40 ppb, about 45 ppb, about 50 ppb, about 55 ppb, about 60 ppb, about 65 ppb, about 70 ppb, about 75 ppb, about 80 ppb, about 85 ppb, about 90 ppb, about 95 ppb, about 100 ppb, etc.). In some embodiments, the shale inhibitor additive may be present in the treatment fluid in an amount of from about 0.25 ppb to about 15 ppb. In some embodiments, the shale inhibitor additive may be present in an amount of from about 0.25 ppb to about 10 ppb.

In some embodiments, the shale inhibitor additive may be activated by exposure to divalent ions or a decreased pH environment. For example, the shale inhibitor additive may be inactive until it contacts a fluid or environment that includes divalent ions, which triggers the shale inhibition properties of the additive (e.g., swelling reduction and/or pore-pressure transmission reduction). In another example, the shale inhibitor additive may be inactive until it contacts a fluid or environment that has a pH of less than 7, less than 6, or less than 5, which may trigger the shale inhibition properties of the additive (e.g., swelling reduction and/or pore-pressure transmission reduction).

In certain embodiments, the treatment fluids and shale inhibitor additives of the present disclosure may be effective over a range of pH levels. For example, in certain embodiments, the shale inhibitor additive of the present disclosure may provide effective shale inhibition from a pH of about 7 to about 12. Additionally, the treatment fluids of the present disclosure may be suitable for a variety of subterranean formations, including, but not limited to shale formations and carbonate formations.

The compositions used in the methods of the present disclosure may include any aqueous or non-aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, oil-in-water emulsions, or any combination thereof. The aqueous fluids may include one or more ionic species, such as those formed by salts dissolved in water. For example, seawater and/or produced water may include a variety of divalent cationic species dissolved therein. Examples of suitable oleaginous fluids that may be included in the oleaginous-based fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and any combination thereof.

In certain embodiments, the additives or treatment fluids of the present disclosure may include a solvent. Examples of solvents suitable for certain embodiments of the present disclosure include, but are not limited to an alcohol, a glycol, polyethylene glycol, acetone, and any combination thereof. In some embodiments, the solvent may include water.

As used herein, the term "treatment fluid" refers to any fluid that may be used in an application in conjunction with a desired function and/or for a desired purpose. The term "treatment" does not imply any particular action by the fluid or any component thereof. The treatment fluids generally include a base fluid. Treatment fluids that may be useful in accordance with the present disclosure include, but are not limited to, drilling fluids, fracturing fluids, gravel packing fluids, pre-pad fluids, pad fluids, preflush fluids, afterflush fluids, acidic fluids, consolidation fluids, cementing fluids, wellbore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that includes a gas), gels, emulsions, gases, and the like. In one or more embodiments, the treatment fluid may have a pH within a range of from about 8 to about 11. In one or more embodiments, the treatment fluid may have a pH within a range of from about 7 to about 12. In other embodiments, the treatment fluid including the corrosion inhibitor additive may have a pH greater than 4, 5, 6, 7, 8, or 9.

In certain embodiments, the methods and compositions of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifying agents, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates at least a portion of a subterranean formation. In certain embodiments, a wellbore may be drilled and the treatment fluid may be circulated in the wellbore during, before, or after the drilling. In some embodiments, the treatment fluid may be introduced at a pressure sufficient to create or enhance one or more fractures within the subterranean formation (e.g., hydraulic fracturing). In certain embodiments, the methods and compositions of the present disclosure may include a treatment fluid introduced into at least a portion of the wellbore or subterranean formation having a temperature of 150° F. (65.5° C.) or higher, 175° F. (79.4° C.) or higher, 200° F. (93.3° C.) or higher, or 250° F. (121.1° C.) or higher.

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the compositions of the present disclosure. The methods and compositions of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like.

Figure 3:
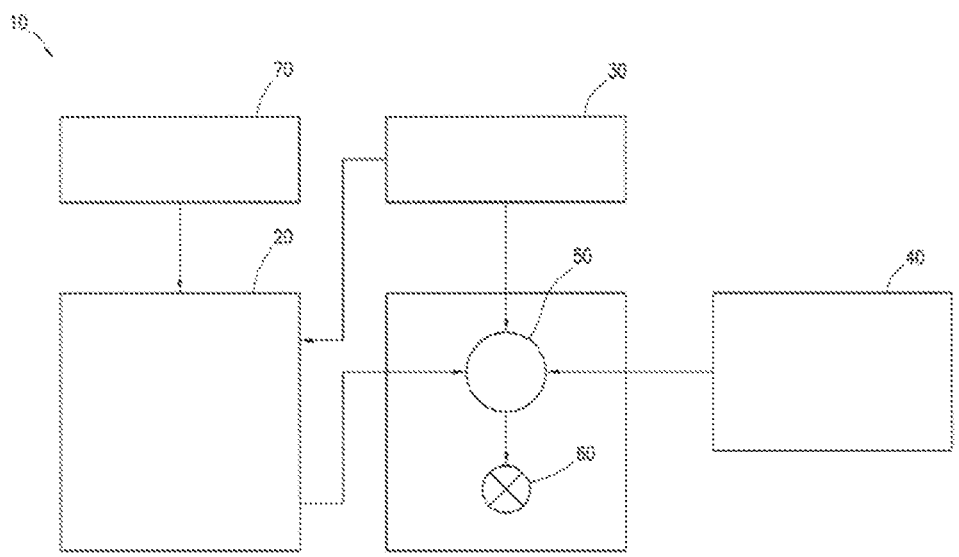
FIG. 3 is a diagram illustrating an example of a system that may be used in accordance with certain embodiments of the present disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 3, the disclosed methods may directly or indirectly affect one or more components or pieces of equipment associated with a system 10, according to one or more embodiments. In certain embodiments, the system 10 includes a fluid producing apparatus 20, a fluid source 30, a shale inhibitor additive source 40, and a pump and blender system 50 and resides at the surface at a well site where a well 60 is located. The fluid can be a fluid for ready use in a treatment of the well 60. In other embodiments, the fluid producing apparatus 20 may be omitted and the fluid sourced directly from the fluid source 30.

The shale inhibitor additive source 40 can include shale inhibitor additives for combination with a fluid. The system 10 may also include additive source 70 that provides one or more additives to alter the properties of the fluid. For example, the other additives 70 can be included to reduce pumping friction, to reduce or eliminate the fluid's reaction to the geological formation in which the well is formed, to operate as surfactants, and/or to serve other functions.

The pump and blender system 50 may receive the fluid and combine it with other components, including the inhibitor additive source 40 and/or additional components from the additives source 70. In certain embodiments, the resulting mixture may be pumped down the well 60 at a pressure suitable to introduce the fluid into one or more permeable zones in the subterranean formation. In certain instances, the fluid producing apparatus 20 and/or fluid source 30, may be equipped with one or more metering devices or sensors (not shown) to control and/or measure the flow of fluids, shale inhibitor additives, proppants, diverters, bridging agents, and/or other compositions to the pumping and blender system 50. In certain embodiments, the metering devices may permit the pumping and blender system 50 to source from one, some, or all of the different sources at a given time, and may facilitate the preparation of fluids in accordance with the present disclosure using continuous mixing or "on-the-fly" methods. Thus, for example, the pumping and blender system 50 can provide just fluid into the well at some times, just additives at other times, and combinations of those components at yet other times.

While not specifically illustrated herein, the disclosed methods and systems may also directly or indirectly affect any transport or delivery equipment used to convey wellbore compositions to the system 50 such as, for example, any transport vessels, conduits, pipelines, trucks, tubulars, and/or pipes used to fluidically move compositions from one location to another, any pumps, compressors, or motors used to drive the compositions into motion, any valves or related joints used to regulate the pressure or flow rate of the compositions, and any sensors (e.g., pressure and temperature), gauges, and/or combinations thereof, and the like.

Figure 4:
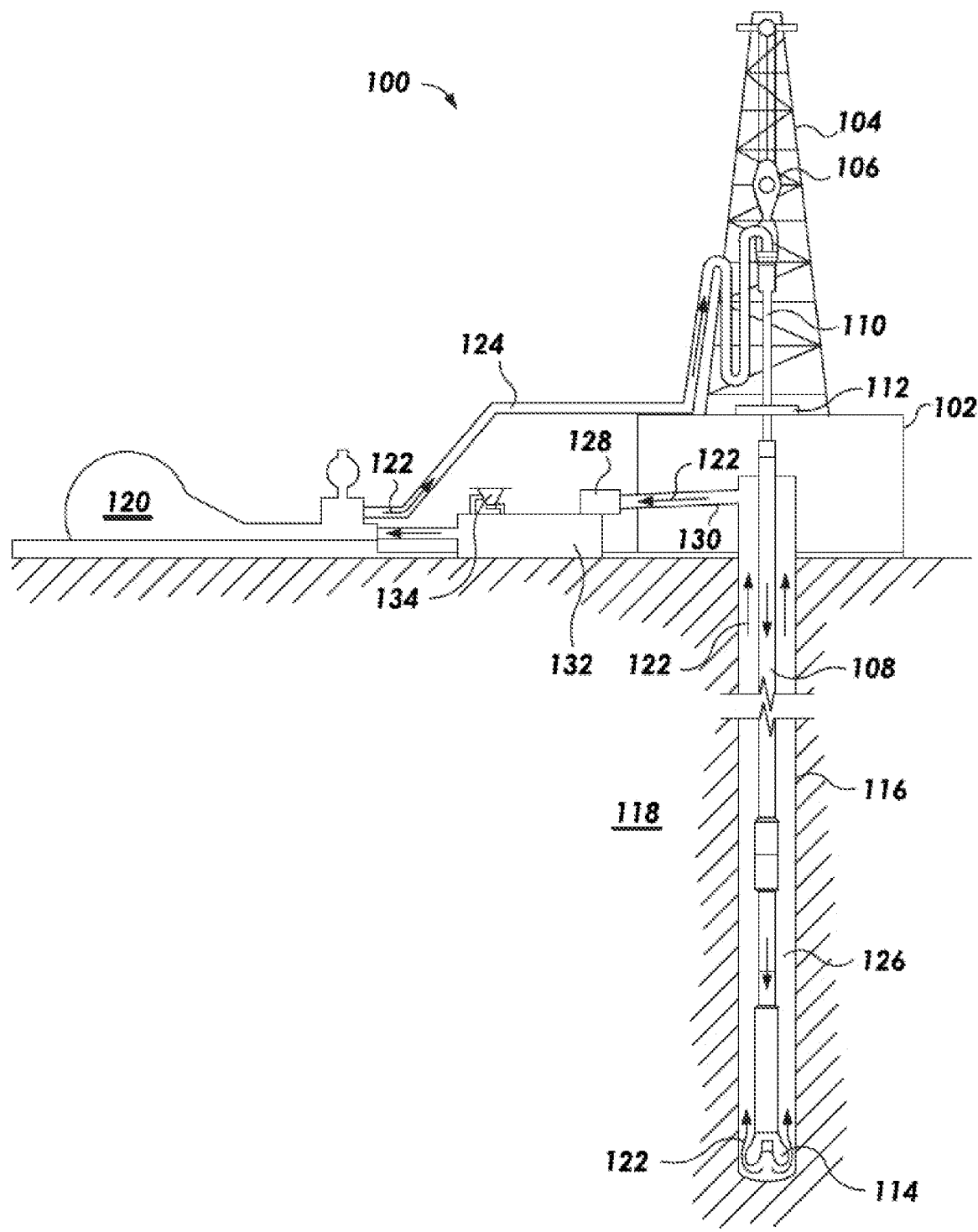
FIG. 4 is a diagram illustrating an example of a wellbore drilling assembly that may be used in accordance with certain embodiments of the present disclosure.

For example, and with reference to FIG. 4, the shale inhibitor additives of the present disclosure may directly or indirectly affect one or more components or pieces of equipment associated with an exemplary wellbore drilling assembly 100, according to one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the wellbore 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. The shale inhibitor additives of the present disclosure may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the shale inhibitor additives of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the shale inhibitor additives of the present disclosure may be stored, reconditioned, and/or regulated until added to the wellbore fluid 122.

As mentioned above, the shale inhibitor additives of the present disclosure may directly or indirectly affect the components and equipment of the drilling assembly 100. For example, the shale inhibitor additives of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary lost circulation materials.

The shale inhibitor additives of the present disclosure may directly or indirectly affect the pump 120, which representatively includes any conduits, pipelines, trucks, tubulars, and/or pipes used to fluidically convey the lost circulation materials downhole, any pumps, compressors, or motors (e.g., topside or downhole) used to drive the lost circulation materials into motion, any valves or related joints used to regulate the pressure or flow rate of the shale inhibitor additive, and any sensors (i.e., pressure, temperature, flow rate, etc.), gauges, and/or combinations thereof, and the like. The shale inhibitor additive of the present disclosure may also directly or indirectly affect the mixing hopper 134 and the retention pit 132 and their assorted variations.

The shale inhibitor additives of the present disclosure may also directly or indirectly affect the various downhole equipment and tools that may come into contact with the shale inhibitor additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The shale inhibitor additives of the present disclosure may also directly or indirectly affect any downhole heat exchangers, valves and corresponding actuation devices, tool seals, packers and other wellbore isolation devices or components, and the like associated with the wellbore 116. The shale inhibitor additives of the present disclosure may also directly or indirectly affect the drill bit 114, which may include, but is not limited to roller cone bits, PDC bits, natural diamond bits, any hole openers, reamers, coring bits, etc.

The methods and compositions of the present disclosure may also directly or indirectly affect the various downhole equipment and tools that may come into contact with the fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

In certain embodiments, the fluids may be formed at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of at least one other component so that the streams are combined and mixed while continuing to flow as a single stream as part of the ongoing treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

An embodiment of the present disclosure is a method including: providing a treatment fluid including a shale inhibitor additive including a silicate anion and a quaternary ammonium cation; introducing the treatment fluid into a wellbore penetrating at least a portion of a subterranean formation that includes shale; and allowing the shale inhibitor additive to interact with the shale in the subterranean formation to at least partially inhibit the shale.

In one or more embodiments described above, the quaternary ammonium cation is selected from the group consisting of: choline, acetyl choline, a choline derivative, a tetramethylammonium cation, a tetraethylammonium cation, a tetrapropylammonium cation, a tetrabutylammonium cation, a quaternary amine ethoxylate, and any combination thereof. In one or more embodiments described above, the quaternary ammonium cation is choline. In one or more embodiments described above, the shale inhibitor additive includes choline silicate. In one or more embodiments described above, the base fluid is an aqueous base fluid. In one or more embodiments described above, the method further includes allowing the shale inhibitor to at least partially inhibit the shale includes allowing the shale inhibitor additive to reduce swelling of at least a portion of the shale and reduce pore-pressure transmission of a fluid into at least a portion of the shale in at least the portion of the subterranean formation. In one or more embodiments described above, the silicate is selected from the group consisting of: an orthosilicate, a pyrosilicate, a cyclic-silicate, a single chain silicate, a double chain silicate, a sheet silicate, a colloidal silicate, and any combination thereof. In one or more embodiments described above, the weight ratio of the silicate to the quaternary ammonium cation is from about 5:1 to about 1:20. In one or more embodiments described above, the shale inhibitor additive is added to the treatment fluid in an amount of from about 0.1 to about 25 pounds per barrel of the treatment fluid.

An embodiment of the present disclosure is a method including: drilling at least a portion of a wellbore to penetrate at least a portion of a subterranean formation that includes shale; circulating a drilling fluid in at least the portion of the wellbore while drilling at least the portion of the wellbore, the drilling fluid including an additive including a base fluid, a silicate anion, and a quaternary ammonium cation; and allowing the additive to interact with the shale in the subterranean formation to at least partially inhibit the shale.

In one or more embodiments described above, the quaternary ammonium cation is choline. In one or more embodiments described above, the shale inhibitor additive includes choline silicate. In one or more embodiments described above, the base fluid is an aqueous base fluid. In one or more embodiments described above, the method further includes allowing the shale inhibitor additive to reduce swelling of at least a portion of the shale and reduce pore-pressure transmission of a fluid into at least a portion of the shale in at least the portion of the subterranean formation. In one or more embodiments described above, the silicate is selected from the group consisting of: an orthosilicate, a pyrosilicate, a cyclic-silicate, a single chain silicate, a double chain silicate, a sheet silicate, a colloidal silicate, and any combination thereof. In one or more embodiments described above, the weight ratio of the silicate to the quaternary ammonium cation is from about 5:1 to about 1:20. In one or more embodiments described above, the shale inhibitor additive is added to the drilling fluid in an amount of from about 0.1 to about 25 pounds per barrel of the drilling fluid.

In another embodiment, the present disclosure provides a composition including an aqueous base fluid, a viscosifying agent, and choline silicate. In one or more embodiments described above, the weight ratio of silicate to choline in the choline silicate is from about 5:1 to about 1:20. In one or more embodiments described above, the choline silicate is present in the composition in an amount of from about 0.1 to about 25 pounds per barrel of the base fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising a shale inhibitor additive comprising a silicate anion and a quaternary ammonium cation; and
introducing the treatment fluid into a wellbore penetrating at least a portion of a subterranean formation that comprises shale,
wherein the quaternary ammonium cation is choline, and
wherein the silicate anion is selected from the group consisting of: an orthosilicate, a pyrosilicate, a cyclic-silicate, a single chain silicate, a double chain silicate, a sheet silicate, a colloidal silicate, and any combination thereof.

2. The method of claim 1, wherein the treatment fluid comprises an aqueous base fluid.

3. The method of claim 1, further comprising allowing the shale inhibitor additive to reduce swelling of at least a portion of the shale and reduce pore-pressure transmission of a fluid into at least a portion of the shale in at least the portion of the subterranean formation.

4. The method of claim 1, wherein the weight ratio of the silicate to the quaternary ammonium cation is from about 5:1 to about 1:20.

5. The method of claim 1, wherein the shale inhibitor additive is added to the treatment fluid in an amount of from about 0.1 to about 25 pounds per barrel of the treatment fluid.

6. The method of claim 1, further comprising allowing the shale inhibitor additive to interact with the shale in the subterranean formation to at least partially inhibit the shale.

7. The method of claim 1, wherein the treatment fluid comprises an aqueous base fluid, wherein the weight ratio of the silicate to the quaternary ammonium cation is from about 5:1 to about 1:20, and wherein the shale inhibitor additive is added to the treatment fluid in an amount of from about 0.1 to about 25 pounds per barrel of the treatment fluid.

8. A method comprising:
drilling at least a portion of a wellbore to penetrate at least a portion of a subterranean formation that comprises shale; and
circulating a drilling fluid in at least the portion of the wellbore while drilling at least the portion of the wellbore, the drilling fluid comprising an additive comprising
a base fluid,
a silicate anion, and
a quaternary ammonium cation,
wherein the quaternary ammonium cation is choline, and
wherein the silicate anion is selected from the group consisting of: an orthosilicate, a pyrosilicate, a cyclic-silicate, a single chain silicate, a double chain silicate, a sheet silicate, a colloidal silicate, and any combination thereof.

9. The method of claim 8, wherein the base fluid is an aqueous base fluid.

10. The method of claim 8, further comprising allowing the additive to reduce swelling of at least a portion of the shale and reduce pore-pressure transmission of a fluid into at least a portion of the shale in at least the portion of the subterranean formation.

11. The method of claim 8, wherein the weight ratio of the silicate to the quaternary ammonium cation is from about 5:1 to about 1:20.

12. The method of claim 8, wherein the additive is added to the drilling fluid in an amount of from about 0.1 to about 25 pounds per barrel of the drilling fluid.

13. The method of claim 8, further comprising allowing the additive to interact with the shale in the subterranean formation to at least partially inhibit the shale.

14. A method comprising:
preparing, at a wellsite, a treatment fluid comprising a shale inhibitor additive comprising a silicate anion and a quaternary ammonium cation; and
introducing the treatment fluid into a wellbore penetrating at least a portion of a subterranean formation that comprises shale,
wherein the quaternary ammonium cation is choline, and
wherein the silicate anion is selected from the group consisting of: an orthosilicate, a pyrosilicate, a cyclic-silicate, a single chain silicate, a double chain silicate, a sheet silicate, a colloidal silicate, and any combination thereof.

15. The method of claim 14, wherein the treatment fluid comprises an aqueous base fluid.

16. The method of claim 14, further comprising allowing the additive to interact with the shale in the subterranean formation to at least partially inhibit the shale.

17. The method of claim 14, further comprising allowing the additive to reduce swelling of at least a portion of the shale and reduce pore-pressure transmission of a fluid into at least a portion of the shale in at least the portion of the subterranean formation.

18. The method of claim 14, wherein the weight ratio of the silicate to the quaternary ammonium cation is from about 5:1 to about 1:20.

19. The method of claim 14, wherein the additive is added to the drilling fluid in an amount of from about 0.1 to about 25 pounds per barrel of the drilling fluid.

20. The method of claim 14, wherein the treatment fluid comprises an aqueous base fluid, wherein the weight ratio of the silicate to the quaternary ammonium cation is from about 5:1 to about 1:20, and wherein the shale inhibitor additive is added to the treatment fluid in an amount of from about 0.1 to about 25 pounds per barrel of the treatment fluid.

* * * * *